(12) United States Patent
Nishizawa

(10) Patent No.: US 11,733,970 B2
(45) Date of Patent: Aug. 22, 2023

(54) ARITHMETIC OPERATION CIRCUIT

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masanori Nishizawa, Ota Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 531 days.

(21) Appl. No.: 16/807,841

(22) Filed: Mar. 3, 2020

(65) Prior Publication Data

US 2021/0089274 A1    Mar. 25, 2021

(30) Foreign Application Priority Data

Sep. 20, 2019  (JP) .............................. JP2019-171260

(51) Int. Cl.
*G06F 7/556*    (2006.01)
*G06N 3/063*    (2023.01)
*G06N 3/04*    (2023.01)

(52) U.S. Cl.
CPC ............... *G06F 7/556* (2013.01); *G06N 3/04* (2013.01); *G06N 3/063* (2013.01)

(58) Field of Classification Search
CPC .......... G06F 7/556; G06N 3/04; G06N 3/063; G06N 3/0481
See application file for complete search history.

(56) References Cited

U.S. PATENT DOCUMENTS 5,613,044 A  *  3/1997  Pechanek ............... G06N 3/063
                                                      706/41
6,304,539 B1    10/2001  Okamoto
(Continued)

FOREIGN PATENT DOCUMENTS

JP    H03-210630 A    9/1991
JP    H05-150786 A    6/1993
(Continued)

OTHER PUBLICATIONS

Ellaithy, Dina M., et al. "Double logarithmic arithmetic technique for low-power 3-D graphics applications." IEEE Transactions on Very Large Scale Integration (VLSI) Systems 25.7 (2017): 2144-2152. (Year: 2017).*
(Continued)

*Primary Examiner* — Ying Yu Chen
*Assistant Examiner* — Sidney Vincent Bostwick
(74) *Attorney, Agent, or Firm* — Kim & Stewart LLP

(57) ABSTRACT

An artificial intelligence system includes a neural network layer including an arithmetic operation circuit that performs an arithmetic operation of a sigmoid function. The arithmetic operation circuit includes a first circuit configured to perform an exponent arithmetic operation using a Napier's constant e as a base and output a first calculation result when an exponent in the exponent arithmetic operation is a negative number, wherein an absolute value of the exponent is used in the exponent arithmetic operation, and a second circuit configured to subtract the first calculation result obtained by the first circuit from 1 and output the subtracted value.

10 Claims, 15 Drawing Sheets

(56) References Cited

U.S. PATENT DOCUMENTS

2019/0042924 A1* 2/2019 Pasca ............... G06N 3/063
2019/0205734 A1 7/2019 Guntoro

FOREIGN PATENT DOCUMENTS

| JP | H06-203058 A | 7/1994 |
| JP | H06-259585 A | 9/1994 |
| JP | 3764269 B2 | 4/2006 |
| JP | 2019-075003 A | 5/2019 |

OTHER PUBLICATIONS

Tsai, Chang-Hung, et al. "A hardware-efficient sigmoid function with adjustable precision for a neural network system." IEEE Transactions on Circuits and Systems II: Express Briefs 62.11 (2015): 1073-1077. (Year: 2015).*

* cited by examiner

| | | | | | | | | | | | | B2 | |
|---|---|---|---|---|---|---|---|---|---|---|---|---|---|
| | 1 | 0 | 0 | 1 | 1 | 0 | 1 | 1 | 0 | 0 | 0 | 0 | ? |
| | 1 | 0 | 0 | 1 | 0 | 1 | 1 | 0 | 1 | 0 | 0 | 1 | ? |
| | 1 | 1 | 0 | 1 | 1 | 0 | 1 | 1 | 0 | 1 | 1 | 0 | ? |
| | 1 | 1 | 0 | 0 | 1 | 1 | 0 | 0 | 1 | 0 | 0 | 1 | ? |
| | 1 | 0 | 0 | 0 | 0 | 1 | 0 | 1 | 1 | 1 | 0 | 1 | ? |
| | 1 | 0 | 0 | 0 | 0 | 0 | 1 | 0 | 0 | 0 | 0 | 1 | ? |
| | 1 | 1 | 1 | 0 | 0 | 0 | 1 | 0 | 1 | 0 | 1 | 1 | ? |
| | 1 | 1 | 1 | 0 | 0 | 0 | 1 | 0 | 1 | 1 | 1 | 0 | ? |
| | 1 | 1 | 1 | 1 | 0 | 1 | 1 | 1 | 0 | 1 | 0 | 0 | ? |
| | 1 | 0 | 1 | 1 | 1 | 0 | 1 | 1 | 1 | 0 | 0 | 0 | ? |
| $\frac{1}{2x}$ | 1 | 0 | 1 | 1 | 0 | 1 | 0 | 1 | 0 | 0 | 0 | 1 | ? |
| | 1 | 0 | 1 | 0 | 1 | 0 | 0 | 0 | 0 | 0 | 1 | 1 | ? |
| | 1 | 0 | 1 | 1 | 1 | 0 | 1 | 1 | 0 | 0 | 1 | 1 | ? |
| | 1 | 0 | 0 | 0 | 1 | 1 | 0 | 0 | 1 | 1 | 0 | 1 | 0 |
| | 1 | 0 | 1 | 1 | 0 | 0 | 0 | 1 | 1 | 1 | 0 | 1 | 0 |
| | 1 | 0 | 1 | 0 | 1 | 0 | 1 | 1 | 0 | 1 | 0 | 0 | 0 |
| | 1 | 0 | 0 | 0 | 0 | 1 | 1 | 0 | 1 | 0 | 0 | 0 | 0 |
| | 1 | 0 | 0 | 1 | 1 | 1 | 0 | 1 | 0 | 0 | 0 | 0 | 0 |
| | 1 | 0 | 1 | 0 | 1 | 1 | 0 | 1 | 0 | 0 | 0 | 0 | 0 |
| | 1 | 0 | 0 | 1 | 0 | 1 | 0 | 0 | 0 | 0 | 0 | 0 | 0 |
| | 1 | 0 | 1 | 0 | 0 | 1 | 0 | 0 | 0 | 0 | 0 | 0 | 0 |
| | 1 | 0 | 1 | 1 | 1 | 0 | 0 | 0 | 0 | 0 | 0 | 0 | 0 |
| | 1 | 1 | 1 | 0 | 0 | 0 | 0 | 0 | 0 | 0 | 0 | 0 | 0 |
| | 1 | 0 | 1 | 0 | 0 | 0 | 0 | 0 | 0 | 0 | 0 | 0 | 0 |
| | 1 | 0 | 0 | 0 | 0 | 0 | 0 | 0 | 0 | 0 | 0 | 0 | 0 |
| | . | . | . | . | . | . | . | . | . | . | . | . | . |
| $x$ | $2^1$ | $2^2$ | $2^3$ | $2^4$ | $2^5$ | $2^6$ | $2^7$ | $2^8$ | $2^9$ | $2^{10}$ | $2^{11}$ | $2^{12}$ | |

RESULT OBTAINED BY ADDING POWER ROOTS OF LOWER bits

FIG. 13

$$e^{1010.01101b} = e^{\left(1\cdot 2^3 + 0\cdot 2^2 + 1\cdot 2^1 + 0\cdot 2^0 + \frac{0}{2^1} + \frac{1}{2^2} + \frac{1}{2^3} + \frac{0}{2^4} + \frac{1}{2^5}\right)}$$

$$= e^{1\cdot 2^3} \cdot e^{0\cdot 2^2} \cdot e^{1\cdot 2^1} \cdot e^{0\cdot 2^0} \cdot e^{\frac{0}{2^1}} \cdot e^{\frac{1}{2^2}} \cdot e^{\frac{1}{2^3}} \cdot e^{\frac{0}{2^4}} \cdot e^{\frac{1}{2^5}}$$

$$e^{2^3} \cdot e^{2^2} \cdot e^{2^1} \cdot e^{2^0} \cdot e^{\frac{1}{2^1}} \cdot e^{\frac{1}{2^2}} \cdot e^{\frac{1}{2^3}} \cdot e^{\frac{1}{2^4}} \cdot e^{\frac{1}{2^5}}$$

$$= e^{2^3} \cdot e^{2^2} \cdot e^{2^1} \cdot e \cdot \sqrt{e} \cdot \sqrt[2^2]{e} \cdot \sqrt[2^3]{e} \cdot \sqrt[2^4]{e} \cdot \sqrt[2^5]{e}$$

$$\underbrace{\phantom{xx}}_{\text{square}} \underbrace{\phantom{xx}}_{\text{square}} \underbrace{\phantom{xx}}_{\text{square}} \underbrace{\phantom{xx}}_{\text{square root}} \underbrace{\phantom{xx}}_{\text{square root}} \underbrace{\phantom{xx}}_{\text{square root}} \underbrace{\phantom{xx}}_{\text{square root}} \underbrace{\phantom{xx}}_{\text{square root}}$$

$$2\left(\frac{0}{2^1}+\frac{1}{2^2}+\frac{1}{2^3}+\frac{1}{2^4}+\cdots+\frac{1}{2^{11}}\right) = 2\left(1+\left(-\frac{1}{2^1}-\frac{0}{2^2}-\frac{0}{2^3}-\frac{0}{2^4}-\cdots-\frac{0}{2^{11}}\right)-\frac{1}{2^{11}}\right)$$

Bit inversion

Added arithmetic operation (shift arithmetic operation)

Added arithmetic operation (multiplication)

Equation (16)

ARITHMETIC OPERATION CIRCUIT

CROSS-REFERENCE TO RELATED APPLICATION(S)

This application is based upon and claims the benefit of priority from Japanese Patent Application No. 2019-171260, filed Sep. 20, 2019, the entire contents of which are incorporated herein by reference.

FIELD

Embodiments described herein relate generally to an arithmetic operation circuit that performs an arithmetic operation of a sigmoid function.

BACKGROUND

In recent years, there has been a trend toward AI development, and for example, methods for implementing in hardware activation functions related to a neural network have been intensively studied.

In the neural network, a sigmoid function is often used as an activation function. However, it is difficult to implement the sigmoid function in hardware due to its complicated calculation formula.

DESCRIPTION OF THE DRAWINGS

FIG. 8 is a diagram illustrating a value of power corresponding to each bit in a power-of-two multiplication of a sigmoid function.

FIG. 9 is a diagram illustrating a value of power corresponding to each bit in the power-of-two multiplication of the sigmoid function.

FIG. 11 is a diagram illustrating a fixed value table of a power root in a power-of-two multiplication of the sigmoid function.

FIG. 13 illustrates Equation (2) described in the first embodiment.

FIG. 14 illustrates Equation (3) described in the first embodiment.

FIG. 15 illustrates Equation (16) described in the sixth embodiment.

DETAILED DESCRIPTION

Figure 1:
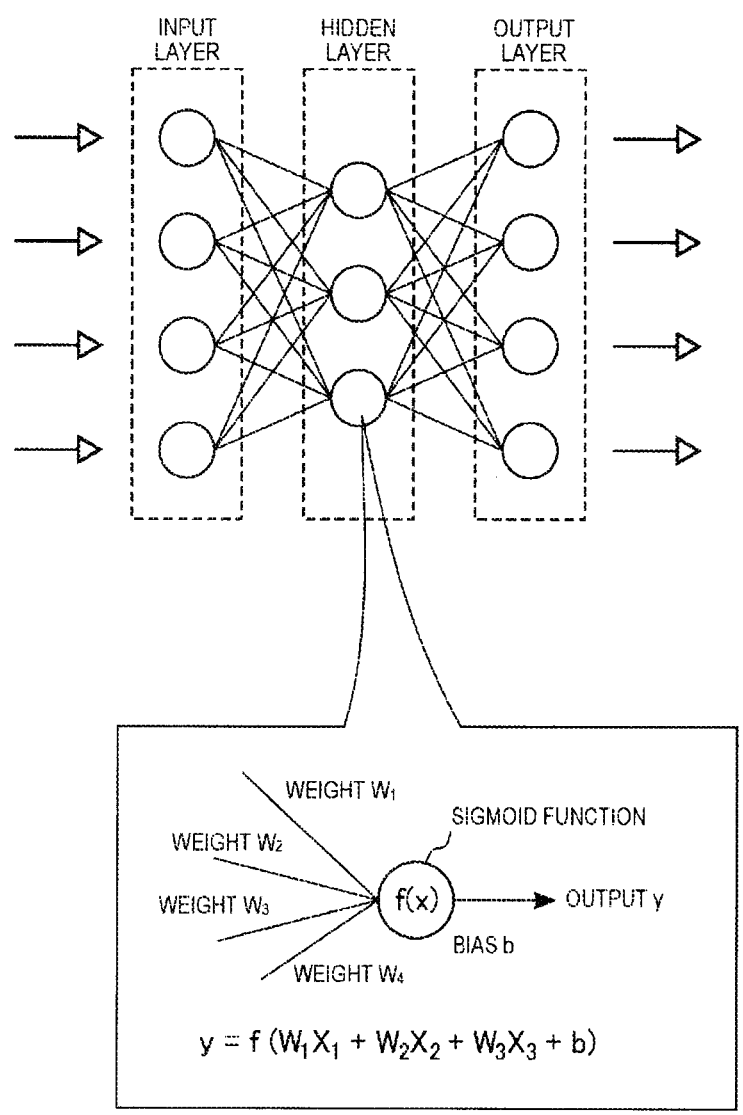
FIG. 1 is a conceptual diagram of a neural network.

Embodiments provide an arithmetic operation circuit that can achieve circuit scale reduction, a shortened arithmetic operation time, or low power consumption and performs an arithmetic operation of a sigmoid function that can be easily implemented in hardware.

In general, according to one embodiment, there is provided an artificial intelligence system includes a neural network layer including an arithmetic operation circuit that performs an arithmetic operation of a sigmoid function. The arithmetic operation circuit includes a first circuit configured to perform an exponent arithmetic operation using a Napier's constant e as a base and output a first calculation result when an exponent in the exponent arithmetic operation is a negative number, wherein an absolute value of the exponent is used in the exponent arithmetic operation, and a second circuit configured to subtract the first calculation result obtained by the first circuit from 1 and output the subtracted value.

Hereinafter, embodiments will be described with reference to drawings. In the following description, the same reference numerals will be given to components that have the same functions and configurations. The respective embodiments described below are intended to illustrate, as examples, a device and a method for implementing technical ideas of the embodiments, and materials, shapes, structures, arrangements, and the like of the components are not limited to those described below. Further, if the respective embodiments can be combined, two or more embodiments may be combined and executed as one embodiment.

The respective functional blocks can be implemented in either hardware or software or a combination thereof. It is not required to distinguish the respective functional blocks as in the following examples. For example, a part of functions may be executed by a functional block that is different from the functional block depicted below. Further, the functional block may be divided to smaller functional sub-blocks.

1. First Embodiment

As described above, a sigmoid function is often used as an activation function in a neural network. FIG. 1 is a conceptual diagram of a neural network. The neural network includes an input layer, a hidden layer, and an output layer. In the embodiments, a sigmoid function is implemented in each of the input layer, the hidden layer, and the output layer as a circuit and depicted as circles in FIG. 1. In one embodiment, the neural network depicted in FIG. 1 is implemented in an artificial intelligence system. For example, the neural network depicted in FIG. 1 is implemented in an artificial intelligence system used for image processing, autonomous vehicles (e.g., self-driving cars), and voice synthesis.

A sigmoid function f(x) is represented by Equation (1) below and may be represented by FIG. 2.

$$f(x) = \frac{1}{1+e^{-ax}} \quad (1)$$

Figure 3:
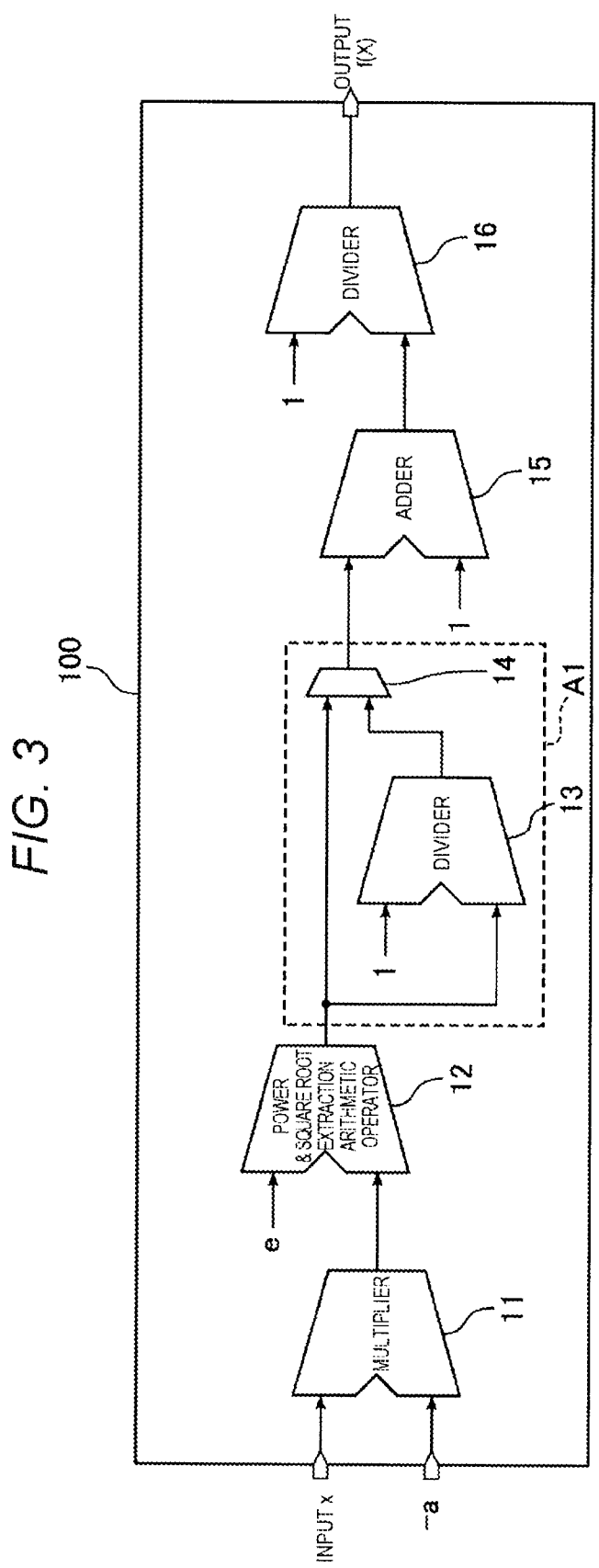
FIG. 3 is a diagram illustrating an example of an arithmetic operation circuit in a comparative example.

An example of an arithmetic operation circuit for performing an arithmetic operation of the sigmoid function f(x) represented by Equation (1) above is illustrated in FIG. 3. An arithmetic operation circuit 100 illustrated in FIG. 3 is a comparative example of the embodiment and includes a multiplier 11, a power and square root extraction arithmetic operator 12, a divider 13, a multiplexer 14, an adder 15, and a divider 16.

An arithmetic operation of the sigmoid function f(x) is performed in such a circuit, and power calculation requires a very large amount of operations.

Hereinafter, the reason that the amount of operations for the power calculation is large in the arithmetic operation of the sigmoid function will be described with reference to an example of a single precision floating point number.

$$e^{12.40625} = e^{1010.01101b}$$

If the above equation is expanded, Equation (2) shown in FIG. 13 is obtained.

Here, it is necessary to repeatedly obtain a square for an integer part of an exponent and to repeatedly obtain a square root for a decimal part of the exponent for a value of the power (power root) of e corresponding to each bit as represented by Equation (3) shown in FIG. 14. Since the exponent is expressed as a value between −126 to 127 as a single precision floating point number, it is necessary to obtain squares and square roots corresponding to it. Also, it is necessary to eventually multiply the obtained numbers, and it is necessary to perform multiplication corresponding to a mantissa (23 bits).

Hereinafter, an arithmetic operation circuit according to a first embodiment will be described. In the first embodiment, a method of replacing a final reciprocal operation (or division) with subtraction in a sigmoid function will be described.

1.1 Configuration of Arithmetic Operation Circuit

Figure 4:
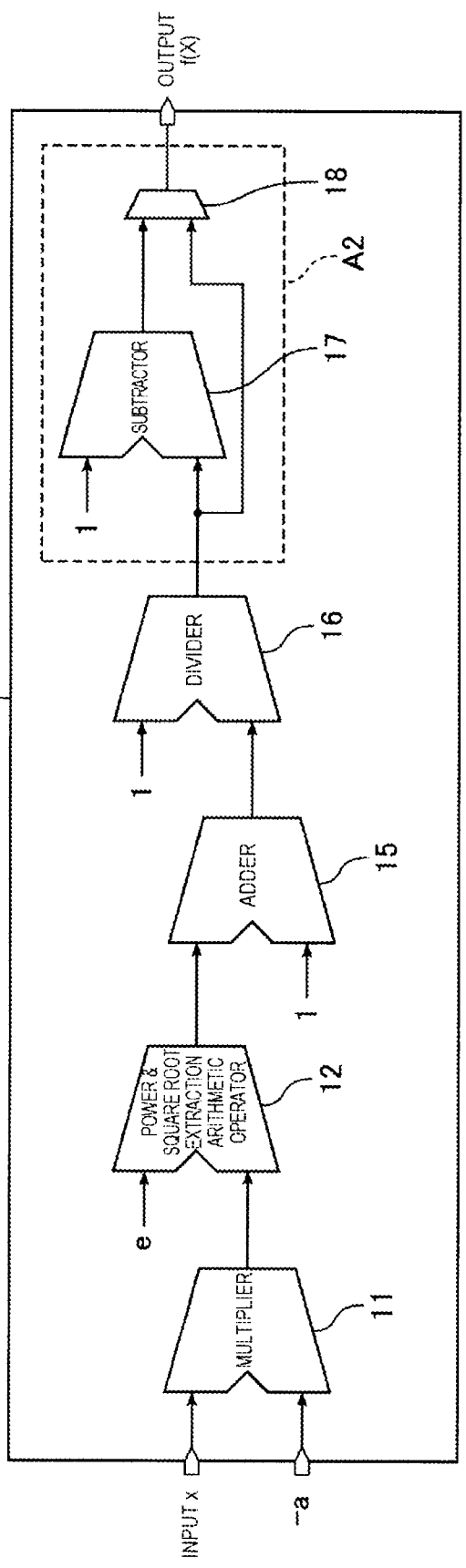
FIG. 4 is a block diagram illustrating a configuration of an arithmetic operation circuit according to a first embodiment.

Referring to FIG. 4, a configuration of an arithmetic operation circuit according to the first embodiment will be described. FIG. 4 is a block diagram illustrating a configuration of the arithmetic operation circuit according to the first embodiment.

The arithmetic operation circuit 10 includes a multiplier 11, a power and square root extraction arithmetic operator 12, an adder 15, a divider 16, a subtractor 17, and a multiplexer 18. Each of the multiplier 11, the power and square root extraction arithmetic operator 12, the adder 15, the divider 16, and the subtractor 17 has a first input terminal, a second input terminal, and an output terminal. The multiplexer 18 has a first input terminal, a second input terminal, a control terminal, and an output terminal. The arithmetic operation circuit 10 illustrated in FIG. 4 is obtained by deleting a circuit A1 from and adding a circuit A2 to the arithmetic operation circuit 100 illustrated in FIG. 3.

1.2 Operations of Arithmetic Operation Circuit

Figure 2:
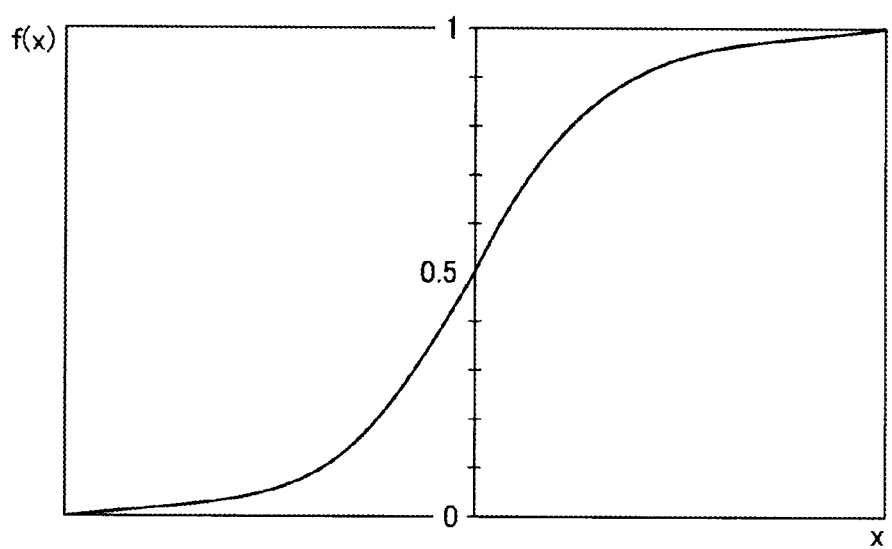
FIG. 2 is a diagram representing a sigmoid function f(x).

An input signal (or an input variable) x is input to the first input terminal of the multiplier 11, and −a is input to the second input terminal of the multiplier 11. a is a value that determines an inclination (a slope) of f(x) in FIG. 2. An output signal from the output terminal of the multiplier 11 is input to the first input terminal of the power and square root extraction arithmetic operator 12, and e is input to the second input terminal of the power and square root extraction arithmetic operator 12. e is a Napier's constant and is a base of a natural logarithm.

An output signal from the output terminal of the power and square root extraction arithmetic operator 12 is input to the first input terminal of the adder 15, and 1 is input to the second input terminal of the adder 15. An output signal from the output terminal of the adder 15 is input to the first input terminal of the divider 16, and 1 is input to the second input terminal of the divider 16.

An output signal from the output terminal of the divider 16 is input to the first input terminal of the subtractor 17 and the first input terminal of the multiplexer 18, and 1 is input to the second input terminal of the subtractor 17. An output signal from the output terminal of the subtractor 17 is input to the second input terminal of the multiplexer 18. The multiplexer 18 outputs a signal input to either the first input terminal or the second input terminal as an output signal f(x) from the output terminal according to a selection signal input to the control terminal.

Hereinafter, a method of replacing a reciprocal operation of the sigmoid function f(x) with subtraction is performed. In a case of x≥0 in the sigmoid function f(x), a reciprocal operation is required after the power arithmetic operation of the base e of the natural logarithm.

If the fact that the sigmoid function f(x) represented by Equation (1) is point-symmetric at coordinates (0, 0.5) as illustrated in FIG. 2, the following equation is established.

$$f(x) = 1 - f(-x)$$

Therefore, it is possible to replace the reciprocal operation with subtraction as represented by Equation (4) below by dividing processing for each symbol of x.

$$f(x) = \begin{cases} 1 - \dfrac{1}{1 + e^{a \cdot |x|}} & \text{if } x \geq 0 \\ \dfrac{1}{1 + e^{a \cdot |x|}} & \text{if } x < 0 \end{cases} \quad (4)$$

Hereinafter, operations of the arithmetic operation circuit according to the first embodiment will be described with reference to FIG. 4.

The multiplier 11 performs multiplication on two signals input to the first input terminal and the second input terminal and output a signal that is proportional to a product of these two signals. Specifically, the multiplier 11 performs multiplication of an input signal x and −a and outputs a product thereof, that is, "−ax".

The power and square root extraction arithmetic operator 12 performs a power arithmetic operation or a square root operation on two signals input to the first input terminal and the second input terminal and outputs a signal that is proportional to the power or the square root extraction of the two signals. Specifically, the power and square root extraction arithmetic operator 12 performs power arithmetic operation on a base "e" and the exponent "−ax" and outputs a result of the power arithmetic operation, that is, "$e^{-ax}$".

The adder 15 performs addition on two signals input to the first input terminal and the second input terminal and outputs a signal that is proportional to the addition result of the two signals. Specifically, the adder 15 performs addition of 1 and $e^{-ax}$ and outputs the addition result, that is, "$1+e^{-ax}$".

The divider 16 performs division on the signal input to the second input terminal with the signal input to the first input terminal and outputs a signal that is proportional to the division result. Specifically, the divider 16 performs "1/(1+$e^{-ax}$)" and outputs a signal that is proportional to "1/(1+$e^{-ax}$).

The subtractor 17 performs subtraction on the signal input to the second input terminal with the signal input to the first input terminal and outputs a signal that is proportional to the subtraction result. Specifically, the subtractor 17 performs "1−{1/(1+$e^{-ax}$)}" and outputs a signal that is proportional to "1−{1/(1+$e^{-ax}$)}".

The multiplexer 18 receives two signals input to the first input terminal and the second input terminal and outputs either one signal of the two signals according to a selection signal input to the control terminal. Specifically, the multiplexer 18 receives "1−{1/(1+$e^{-ax}$)}" and "1/(1+$e^{-ax}$)} and outputs either one of the signals as an output signal f(x) according to the selection signal. More specifically, the multiplexer 18 receives "1−{1/(1+$e^{-ax}$)}" and "1/(1+$e^{-ax}$)}, and outputs "1−{1/(1+$e^{-ax}$)}" when x≥0 or outputs "1/(1+$e^{-ax}$)} as an output signal f(x) when x<0.

1.3 Advantages of First Embodiment

According to the first embodiment, it is possible to achieve circuit scale reduction, a shortened arithmetic operation time, and low power consumption of the arithmetic operation circuit for performing an arithmetic operation of a sigmoid function. In this manner, the sigmoid function can be easily implemented in hardware.

In the first embodiment, it is possible to replace reciprocal operation performed after the power arithmetic operation with subtraction by dividing the processing of the sigmoid function for each of positive and negative symbols of x. The divider 13 illustrated in FIG. 3 is deleted, and the subtractor 17 is added to a stage after the divider 16 as illustrated in FIG. 4. In this manner, it is possible to reduce the circuit scale of the arithmetic operation circuit that performs the arithmetic operation of the sigmoid function and to make it easy to implement the sigmoid function in hardware. Further, it is possible to reduce an arithmetic operation time and reduce power consumption of the arithmetic operation circuit.

The embodiment may be implemented in hardware using arithmetic operators (or an arithmetic operation circuit) such as a multiplier, a power and square root extraction arithmetic operator, an adder, a divider, and a subtractor as described above, or may be implemented in software using a processor such as a central processing unit (CPU) or a digital signal processor (DSP).

2. Second Embodiment

Next, an arithmetic operation circuit according to a second embodiment will be described. In the second embodiment, a method for simplifying a power arithmetic operation by performing equation transformation from an exponential function of a base e of a natural logarithm to an exponential function of 2 in a sigmoid function will be described.

Figure 5:
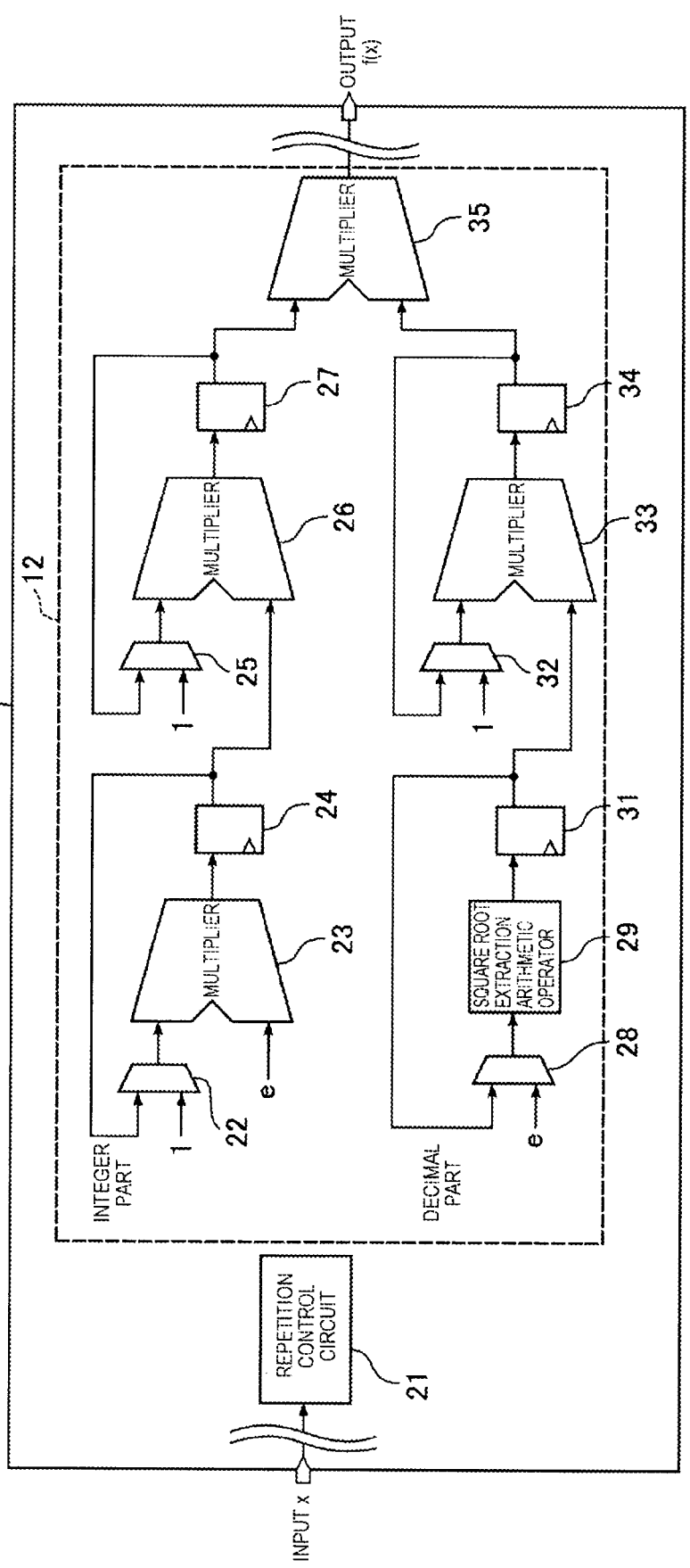
FIG. 5 is a block diagram illustrating a configuration of an arithmetic operation circuit including a power and square root extraction arithmetic operator in a comparative example.

First, an arithmetic operation circuit according to a comparative example of the embodiment will be described. FIG. 5 is a block diagram illustrating a configuration of an arithmetic operation circuit 200 including a power and square root extraction arithmetic operator 12 according to the comparative example. The arithmetic operation circuit 200 includes a repetition control circuit 21 and a power and square root extraction arithmetic operator 12. The arithmetic operation circuit 200 is for illustrating the power and square root extraction arithmetic operator 12 in the arithmetic operation circuit 100 (or 10) in detail, and the other circuits are omitted. The power and square root extraction arithmetic operator 12 includes a multiplexer 22, a multiplier 23, a latch circuit 24, a multiplexer 25, a multiplier 26, a latch circuit 27, a multiplexer 28, a square root extraction arithmetic operator 29, a latch circuit 31, a multiplexer 32, a multiplier 33, a latch circuit 34, and a multiplier 35.

For calculation related to an exponential function of e in the sigmoid function f(x), that is, calculation using the base e of the natural logarithm, a large number of multipliers are required as illustrated in FIG. 5, and calculation becomes complicated. Therefore, the exponential function of e in the sigmoid function f(x) is transformed to an exponential function of 2 in order to simplify power arithmetic operation.

First, the following definition is made: $e^x = 2^y$, $y = \log_2 e^x = x \cdot \log_2 e$ Therefore, it is possible to replace the sigmoid function f(x) as represented by Equation (5) below.

$$f(x) = \frac{1}{1+e^{-ax}} = \frac{1}{1+2^{(-ax \cdot \log_2 e)}} = \frac{1}{1+2^{-bx}} \quad (5)$$

$$b = -a \cdot \log_2 e_{(constant)}$$

In the above equation, $\log_2 e$ is a constant, namely, $\log_2 e = 1.442695041$

2.1 Configuration of Arithmetic Operation Circuit

Figure 6:
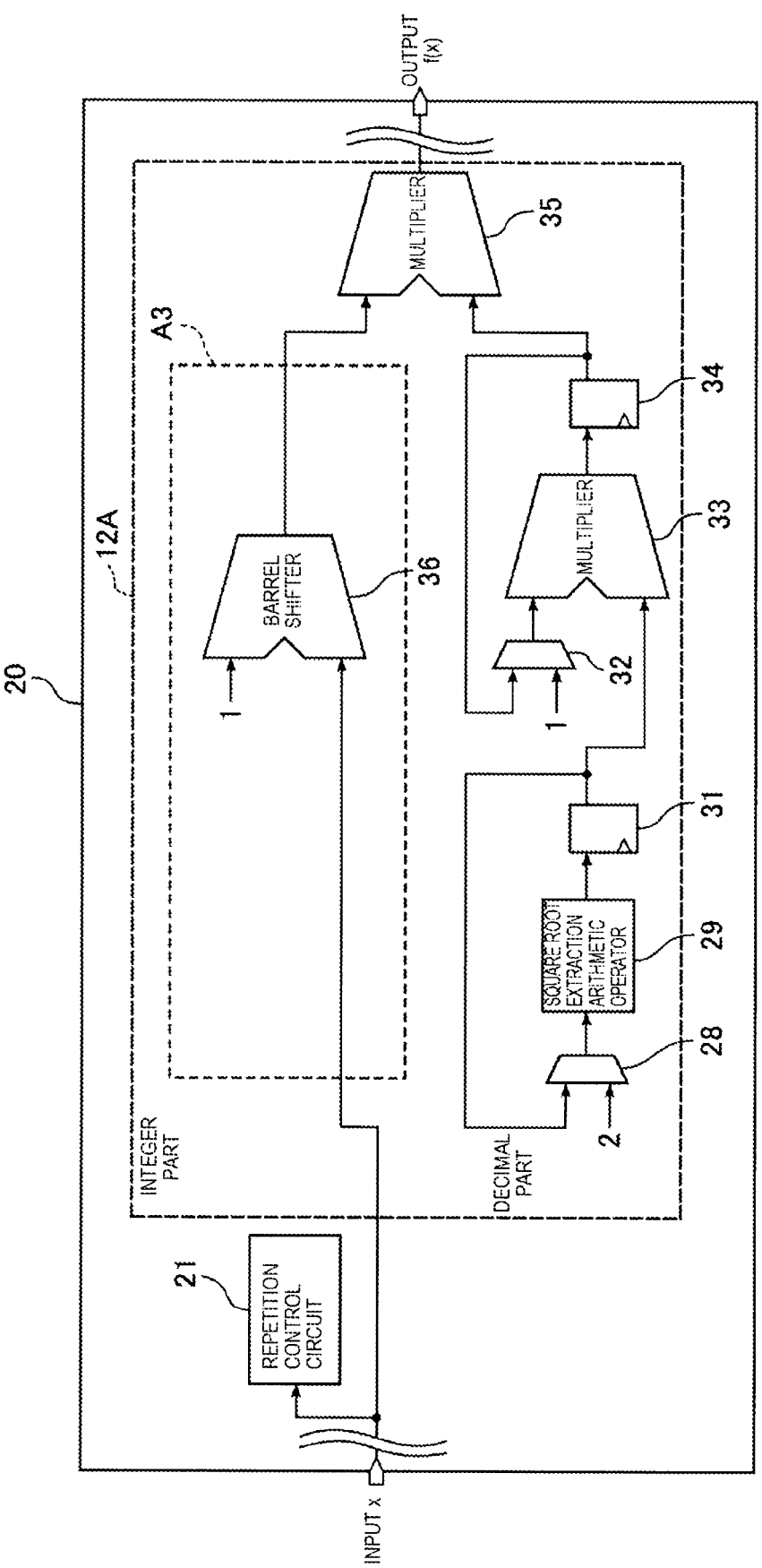
FIG. 6 is a block diagram illustrating a configuration of an arithmetic operation circuit according to a second embodiment.

Referring to FIG. 6, a configuration of an arithmetic operation circuit according to a second embodiment will be described. FIG. 6 is a block diagram illustrating a configuration of an arithmetic operation circuit 20 including a power and square root extraction arithmetic operator 12A according to the second embodiment.

If it is possible to replace the exponential function of the base e with an exponential function of 2 as represented by Equation (5) described above, it is possible to replace a plurality of multipliers at an integer part in the power and square root extraction arithmetic operator 12 in the arithmetic operation circuit 200 and repetition of multiplication performed by the multipliers over a plurality of times with a barrel shifter 36 as illustrated in A3. In this manner, it is possible to reduce the circuit scale of the arithmetic operation circuit 20 according to the second embodiment. Hereinafter, the arithmetic operation circuit 20 with a reduced size will be described.

As illustrated in FIG. 6, the arithmetic operation circuit 20 includes a repetition control circuit 21 and a power and square root extraction arithmetic operator 12A. In the arithmetic operation circuit 20, the power and square root extraction arithmetic operator 12 in the arithmetic operation circuit 10 (or 100) is replaced with the power and square root extraction arithmetic operator 12A, and the other circuits are omitted.

The repetition control circuit 21 controls repeated arithmetic operations by the square root extraction arithmetic operator 29 and the multiplier 33. For calculation of a power of 2 when an exponent is a decimal number, it is necessary to perform an arithmetic operation of a square root extraction of 2, to obtain a square root value X, and to multiply the value. Further, a square root of the square root value X is further obtained, and these values are multiplied in order to calculate the following lower digit of the decimal number of the exponent. In this manner, for calculation of the decimal number of the exponent that is smaller than 0, it is necessary to perform square root extraction of a square root and multiplication for each digit of the decimal number of the exponent and to repeat the square root extraction and the multiplication corresponding to the number of digits. The repetition control circuit 21 performs processing of repeating the square root extraction arithmetic operation of the square root and the multiplication corresponding to the number of digits of the decimal number. The same applies to the repetition control circuit 21 in the following embodiments.

The power and square root extraction arithmetic operator 12A includes a barrel shifter 36, a multiplexer 28, a square root extraction arithmetic operator 29, a latch circuit 31, a multiplexer 32, a multiplier 33, a latch circuit 34, and a multiplier 35. Each of the barrel shifter 36, the multiplier 33, and the multiplier 35 has a first input terminal, a second input terminal, and an output terminal. Each of the multiplexers 28 and 32 has a first input terminal, a second input terminal, a control terminal, and an output terminal. Each of the latch circuits 31 and 34 has an input terminal and an output terminal.

2.2 Operations of Arithmetic Operation Circuit

Hereinafter, operations of the arithmetic operation circuit 20 according to the second embodiment will be described with reference to FIG. 6.

An input signal x is input to the repetition control circuit 21. In a circuit that processes an integer part of the power and square root extraction arithmetic operator 12A in the arithmetic operation circuit 20, the input signal x is input to the first input terminal of the barrel shifter 36, and 1 is input to the second input terminal of the barrel shifter 36. An output signal from the output terminal of the barrel shifter 36 is input to the first input terminal of the multiplier 35.

In a circuit that processes a decimal part of the power and square root extraction arithmetic operator 12A, 2 is input to the first input terminal of the multiplexer 28, an output signal from the output terminal of the multiplexer is input to the input terminal of the square root extraction arithmetic operator 29, and an output signal from the output terminal of the square root extraction arithmetic operator 29 is input to the input terminal of the latch circuit 31. An output signal from the output terminal of the latch circuit 31 is input to the second input terminal of the multiplexer 28 and the first input terminal of the multiplier 33, that is, the output signal from the output terminal of the latch circuit 31 is fed back to the second input terminal of the multiplexer 28 and is also input to the first input terminal of the multiplier 33.

An output signal from the output terminal of the multiplier 33 is input to the input terminal of the latch circuit 34. 1 is input to the first input terminal of the multiplexer 32, and an output signal from the output terminal of the multiplexer 32 is input to the second input terminal of the multiplier 33. An output signal from the output terminal of the latch circuit 34 is input to the second input terminal of the multiplexer 32 and the second input terminal of the multiplier 35, that is, the output signal from the output terminal of the latch circuit 34 is fed back to the second input terminal of the multiplexer 32 and is also input to the second input terminal of the multiplier 35. Further, an output signal from the output terminal of the multiplier 35 is output to a circuit in a later stage. An arithmetic operation of the sigmoid function f(x) represented by Equation (5) is performed using the arithmetic operation circuit 20 including such a power and square root extraction arithmetic operator 12A.

2.3 Advantages of Second Embodiment

According to the second embodiment, it is possible to achieve circuit scale reduction of the arithmetic operation circuit for performing an arithmetic operation of a sigmoid function, a reduced arithmetic operation time, and low power consumption. In this manner, it is possible to easily implement the sigmoid function in hardware.

According to the second embodiment, it is possible to reduce the multiplier required for the arithmetic operation by replacing the exponential function of the base e of the natural logarithm with the exponential function of 2 in the sigmoid function. The multipliers 23 and 26 illustrated in FIG. 5 are replaced with the barrel shifter 36 as illustrated in FIG. 6. In this manner, it is possible to reduce the circuit scale of the arithmetic operation circuit that performs the arithmetic operation of the sigmoid function and to make it easy to implement the sigmoid function in hardware. Further, it is possible to reduce an arithmetic operation time and reduce power consumption of the arithmetic operation circuit.

The embodiment may be implemented in hardware using various arithmetic operators (or an arithmetic operation circuit) as described above or may be implemented in software using a processor such as a CPU or a DSP.

3. Third Embodiment

Next, an arithmetic operation circuit according to a third embodiment will be described. In the third embodiment, a method of deleting unnecessary calculation using a fact that information lacking occurs in calculation values in an arithmetic operation of a sigmoid function, will be described.

First, addition of $2^{b|x|}$ and 1 in a sigmoid function f(x) is examined.

$$f(x) = \begin{cases} 1 - \dfrac{1}{1+2^{b \cdot |x|}} & \text{if } x \geq 0 \\ \dfrac{1}{1+2^{b \cdot |x|}} & \text{if } x < 0 \end{cases} \quad (6)$$

As represented by Equation (6) described above, the sigmoid function f(x) includes addition of $2^{b|x|}$ and 1. A mantissa of the single precision floating point number is obtained by adding 23 bits, a guard bit, and a round bit and is thus 25 bits. Therefore, it is possible to ignore 1 to be added to $2^{b|x|}$ in a case of b|x|≥26. This is because information lacking occurs in the calculation value when 1 is added to $2^{b|x|}$.

At this time, Equation (6) may be converted to Equation (7) below, and in a case of b|x|≥26, $2^{b|x|}$ becomes an infinite large number ∞, and a value of the sigmoid function f(x) is uniquely decided as represented by Equation (7). That is, the sigmoid function g(x) is 1 in a case of x≥26 while the sigmoid function f(x) is 0 in a case of x≤−26.

$$f(x) = \begin{cases} 1 - \dfrac{1}{2^{b \cdot |x|}} = 1 - \dfrac{1}{\infty} = 1 & \text{if } x \geq 26 \\ \dfrac{1}{2^{b \cdot |x|}} = \dfrac{1}{\infty} = 0 & \text{if } x \leq -26 \end{cases} \quad (7)$$

3.1 Configuration of Arithmetic Operation Circuit

Figure 7:
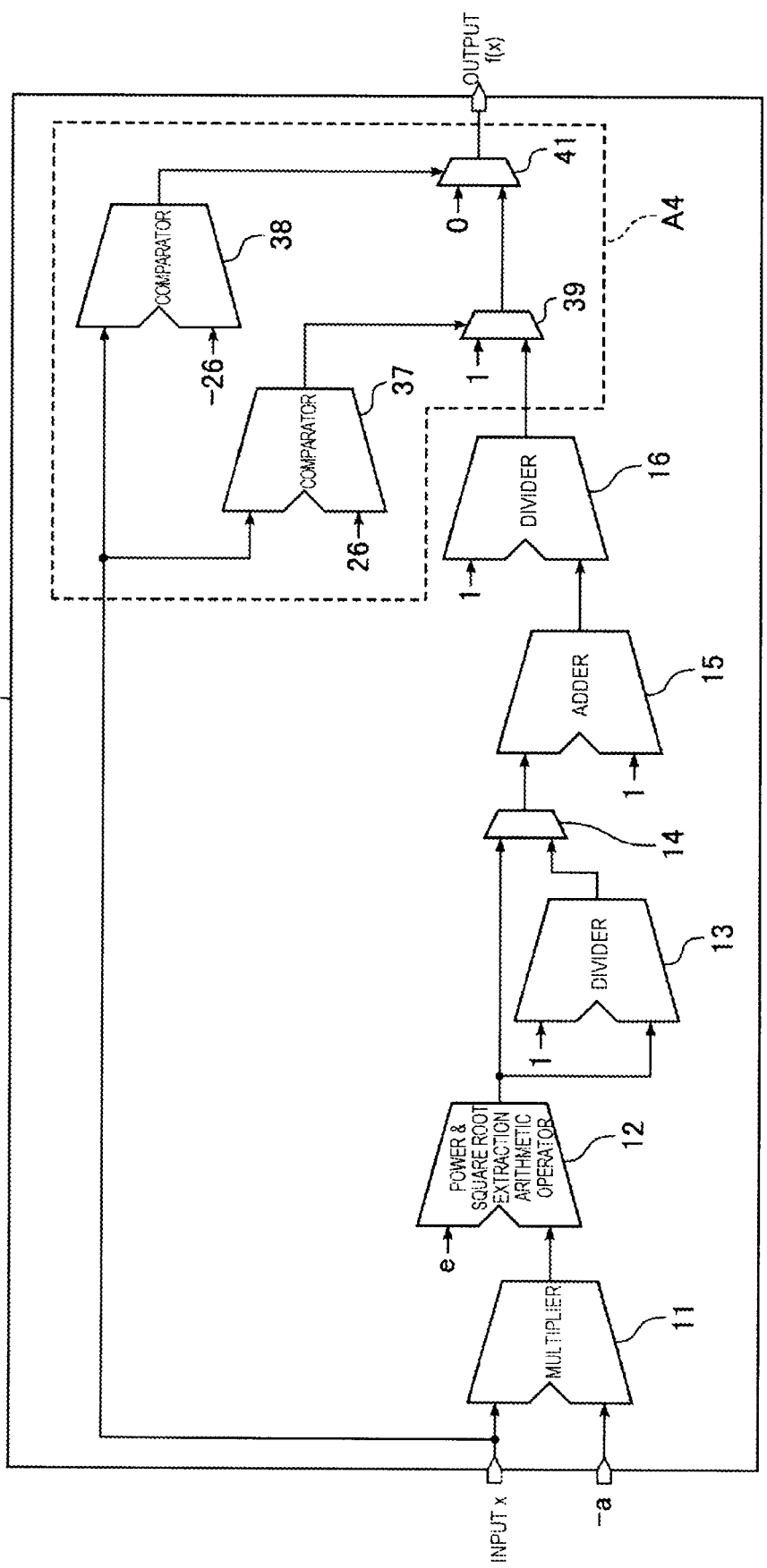
FIG. 7 is a block diagram illustrating a configuration of an arithmetic operation circuit according to a third embodiment.

Referring to FIG. 7, a configuration of an arithmetic operation circuit according to a third embodiment will be described. FIG. 7 is a block diagram illustrating a configuration of an arithmetic operation circuit according to the third embodiment.

An arithmetic operation circuit 30 includes a multiplier 11, a power and square root extraction arithmetic operator 12, a divider 13, a multiplexer 14, an adder 15, a divider 16, a comparator 37, a comparator 38, and multiplexers 39 and 41. Each of the multiplier 11, the power and square root extraction arithmetic operator 12, the divider 13, the adder 15, the divider 16, and the comparators 37 and 38 has a first input terminal, a second input terminal, and an output terminal. Each of the multiplexers 14, 39, and 41 has a first input terminal, a second input terminal, a control terminal, and an output terminal.

3.2 Operations of Arithmetic Operation Circuit

Hereinafter, operations of an arithmetic operation circuit 30 according to a third embodiment will be described with reference to FIG. 7.

An input signal x is input to the first input terminal of the multiplier 11, and −a is input to the second input terminal of the multiplier 11. a is a value that determines an inclination (a slope) of f(x) in FIG. 2. An output signal from the output terminal of the multiplier 11 is input to the first input terminal of the power and square root extraction arithmetic operator 12, and a base e is input to the second input terminal of the power and square root extraction arithmetic operator 12.

An output signal from the output terminal of the power and square root extraction arithmetic operator 12 is input to the first input terminal of the divider 13 and the first input terminal of the multiplexer 14, and 1 is input to the second input terminal of the divider 13. An output signal from the output terminal of the divider 13 is input to the second input terminal of the multiplexer 14.

An output signal from the output terminal of the multiplexer 14 is input to the first input terminal of the adder 15, and 1 is input to the second input terminal of the adder 15. An output signal from the output terminal of the adder 15 is input to the first input terminal of the divider 16, and 1 is input to the second input terminal of the divider 16.

An output signal from the output terminal of the divider 16 is input to the first input terminal of the multiplexer 39, and 1 is input to the second input terminal of the multiplexer 39. An output signal from the output terminal of the multiplexer 39 is input to the first input terminal of the multiplexer 41, and 0 is input to the second input terminal of the multiplexer 41.

Also, an input signal x is input to the first input terminal of the comparator 37 and the first input terminal of the comparator 38, 26 is input to the second input terminal of the comparator 37, and −26 is input to the second input terminal of the comparator 38.

An output signal from the output terminal of the comparator 37 is input to the control terminal of the multiplexer 39. The multiplexer 39 outputs a signal input to either the first input terminal or the second input terminal according to an output signal (which is a selection signal in this example) input to the control terminal. An output signal from the output terminal of the comparator 38 is input to the control terminal of the multiplexer 41. The multiplexer 41 outputs, as an output signal f(x), a signal input to either the first input terminal or the second input terminal according to an output signal (which is a selection signal in this example) input to the control terminal.

In other words, the input signal x is input to each of the first input terminals of the comparators 37 and 38 in the arithmetic operation circuit 30. 26 is input to the second input terminal of the comparator 37, and −26 is input to the second input terminal of the comparator 38. A result of comparing, the input signal x and 26 is output as a selection signal from the output terminal of the comparator 37. A result of comparing, the input signal x and −26 is output as a selection signal from the output terminal of the comparator 38. The multiplexer 39 outputs either the output signal from the divider 16 or 1 according to the selection signal output from the comparator 37. Further, the multiplexer 41 outputs either the output signal from the multiplexer 39 or 0 according to the selection signal output from the comparator 38.

That is, when the input signal x is equal to or greater than 26, the multiplexer 39 outputs 1 as an output signal, and further, the multiplexer 41 outputs 1, which has been received from the multiplexer 39, as an output signal f(x). Meanwhile, when the input signal x is equal to or less than −26, the multiplexer 41 outputs 0 as an output signal f(x). Using such an arithmetic operation circuit 30, the arithmetic operation of the sigmoid function f(x) represented by Equation (7) is performed.

3.3 Advantages of Third Embodiment

According to the third embodiment, it is possible to reduce an arithmetic operation time in the arithmetic operation circuit and to reduce power consumption by deleting the amount of calculation for the integer part of the calculation value by using the fact that information lacking occurs in the calculation value in the arithmetic operation of the sigmoid function. In this manner, it becomes easy to implement the sigmoid function in hardware.

Although the arithmetic operation circuit 30 according to the third embodiment is obtained by adding a circuit A4 to the arithmetic operation circuit 100 illustrated in FIG. 3, a configuration in which the circuit A4 is added to a stage after the multiplexer 18 in the arithmetic operation circuit 10 illustrated in FIG. 4 may also be employed.

The embodiment may be implemented in hardware using various arithmetic operators (or an arithmetic operation circuit) as described above or can be implemented in software using a processor such as a CPU or a DSP.

4. Fourth Embodiment

Next, an arithmetic operation circuit according to a fourth embodiment will be described. Although the amount of calculation for the integer part of the calculation value is reduced by using the information lacking of the calculation value in the sigmoid function in the aforementioned third embodiment, the amount of calculation for a decimal part of a calculation value is reduced using information lacking in the calculation value in the fourth embodiment.

With respect to the decimal part of the calculation value, that is, the part after the decimal point (e.g., the fractional part), calculation up to the lower 23 bits is sufficient in consideration of the addition of $2^{b|x|}$ and 1. This is because information lacking occurs in the part at and after the lower 24-th bit at the time of the addition of $2^{b|x|}$ and 1. Since the configuration and the operations of the arithmetic operation circuit according to the fourth embodiment are similar to those of the aforementioned third embodiment, description thereof will be omitted.

5. Fifth Embodiment

Next, an arithmetic operation circuit according to a fifth embodiment will be described. In the fifth embodiment, a method for simplifying multiplication calculation of lower 12 bits below a decimal point of an exponent in a power-of-2 calculation in a sigmoid function will be described.

Hereinafter, how to calculate a numerical value, the exponent is a decimal number, in power-of-two calculation will be described. For example, the following numerical value will be described as an example.

$2^{14.40625} = 2^{1110.01101b}$ (binary expression of an exponential part)

The exponent may be divided into an integer part and a decimal part. The decimal part may be expressed as a fraction.

The X-th digit below the decimal point of the decimal part may be expressed as $$2^{\frac{1}{2^x}}.$$

The above numerical value is represented by Equation (8) below.

$$2^{1110.01101b} = 2^{\left(14+\frac{0}{2^1}+\frac{1}{2^2}+\frac{1}{2^3}+\frac{0}{2^4}+\frac{1}{2^5}\right)} \quad (8)$$

The addition of the exponent in Equation (8) may be replaced as represented by Equation (9) below.

$$2^{\left(14+\frac{0}{2^1}+\frac{1}{2^2}+\frac{1}{2^3}+\frac{0}{2^4}+\frac{1}{2^5}\right)} = 2^{14} \cdot \left(2^{\frac{1}{2^2}}, 2^{\frac{1}{2^3}}, 2^{\frac{1}{2^5}}\right) \quad (9)$$

The integer part $2^{14}$ can be obtained by a shift arithmetic operation of 1 (14-bits left shift). In this manner, it is possible to reduce the large amount of multiplication for the integer part to one shift arithmetic operation by transforming the base e into 2 (see the second embodiment).

The fraction 2½ of the exponent of the decimal part is a square root $\sqrt{2}$ of 2, and 2¼ is a $4^{th}$ root $$\sqrt[4]{2}$$

of 2. The arithmetic operation for obtaining a square root is called square root extraction arithmetic operation, and it is possible to obtain $2^n$-th root $$\sqrt[2n]{2}$$

of 2 by repeating the square root extraction arithmetic operation of 2.

To calculate the decimal number of the exponent in the power-of-2 calculation, the following operation is performed.

In consideration of information lacking due to addition of $2^{b|x|}$ and 1, calculation of 23 bits below the decimal point is performed.

The first decimal point corresponds to 2½ (a square root $\sqrt{2}$ of 2), the second decimal point corresponds to 2¼ (a 4-th root $$\sqrt[4]{2}$$

of 2), the twenty third decimal point corresponds to $$2^{\frac{1}{2^{23}}}$$

a $2^{23}$-th root $$\sqrt[2^{23}]{2}$$

of 2), and values corresponding to a case in which each bit is 1 are multiplied. Here, a power value corresponding to each bit is shown in FIG. 7.

Figure 8:
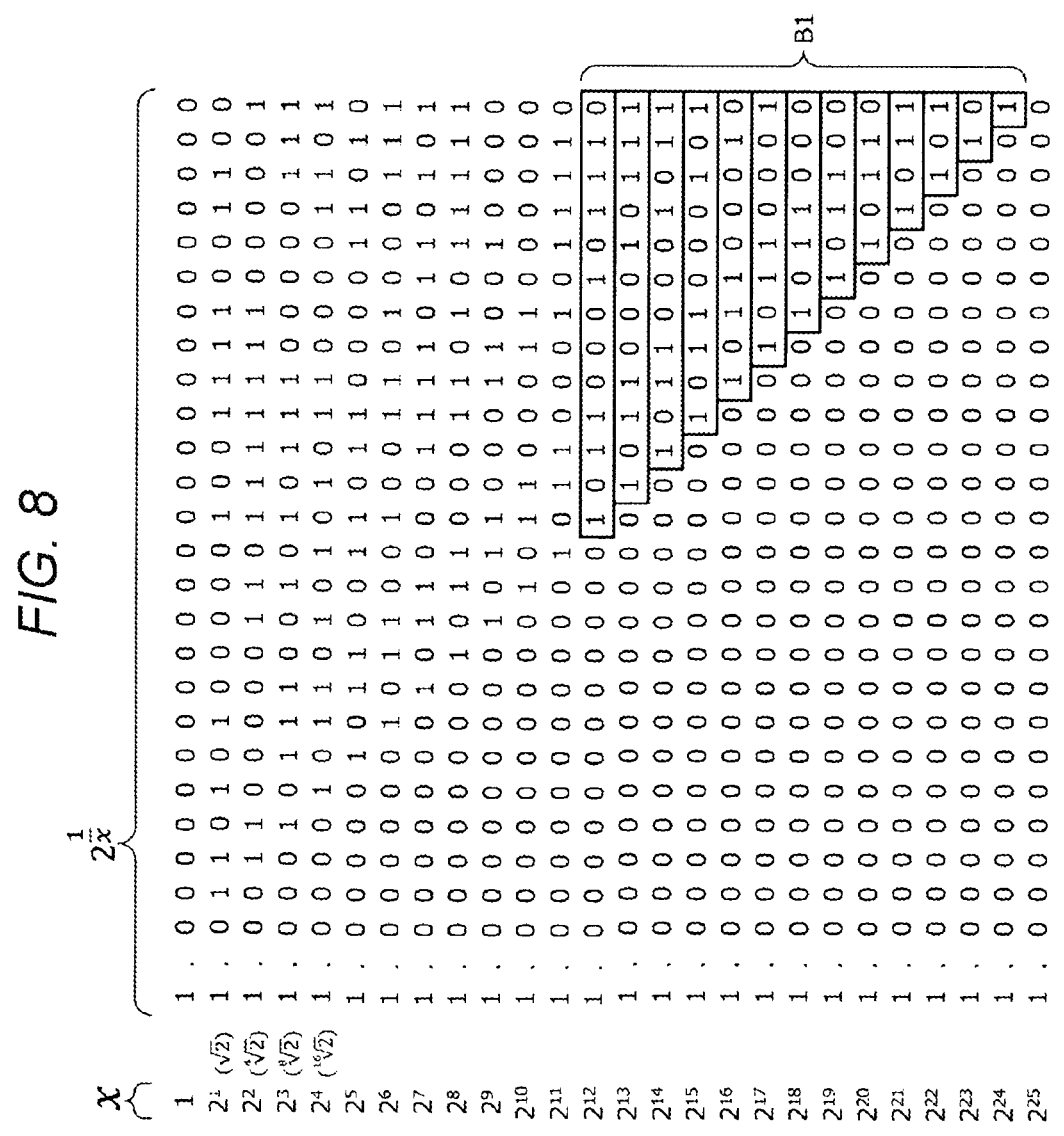

As illustrated in B1 in FIG. 8, it is possible to recognize that a numerical sequence of a certain value appears with 1-bit deviation when a power root value after $x=2^{12}$ is observed. Using this, a combination of multiplication of each bit (a maximum of 12 times) may be replaced with one multiplication operation.

Figure 9:
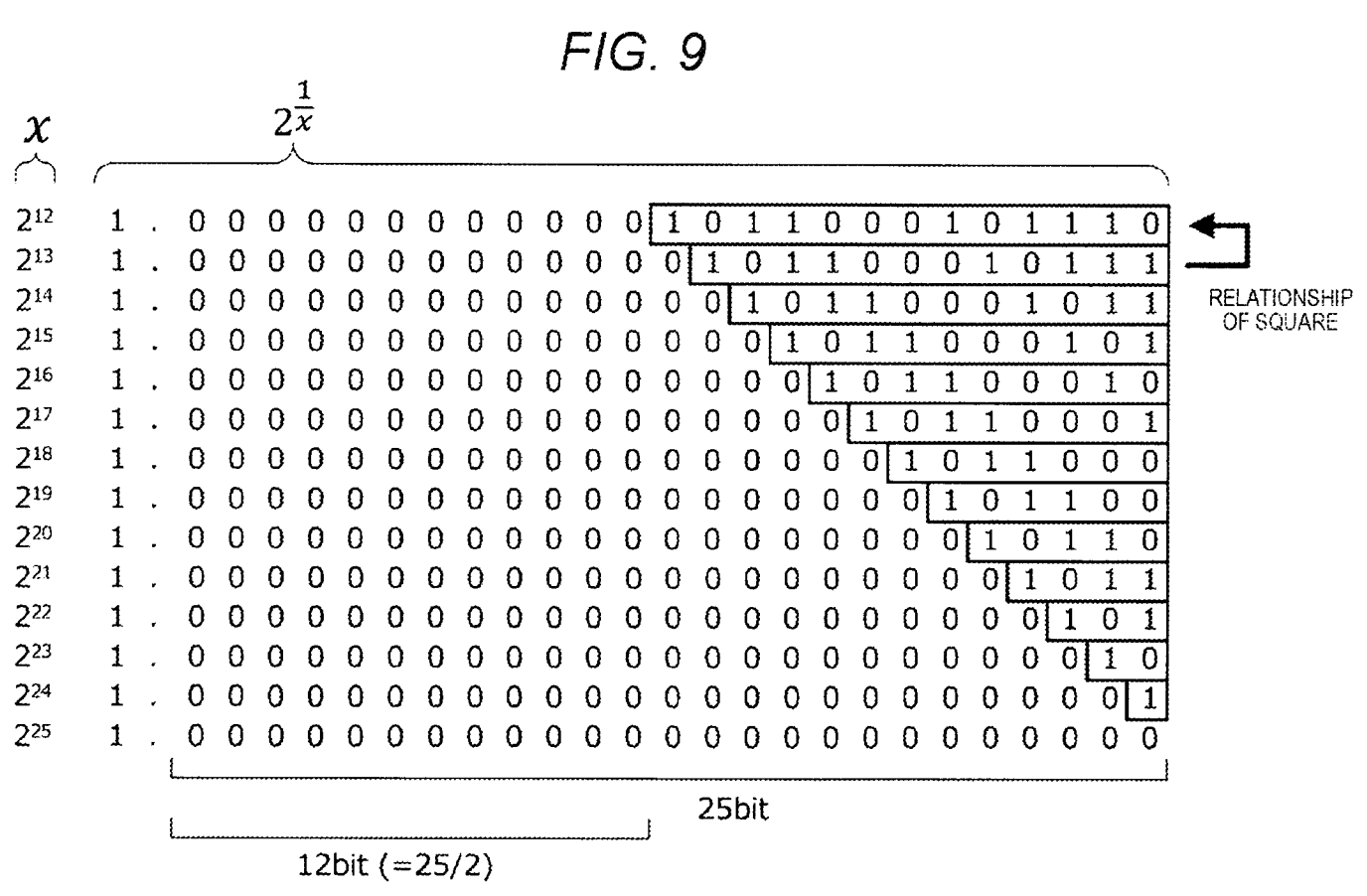

Hereinafter, combinations of the multiplication of each bit will be described in detail with reference to FIG. 9. FIG. 9 is a diagram illustrating a power root value after $x=2^{12}$ illustrated in FIG. 8.

When a half or more of all bits are 0, the same numerical sequence appears after the first 1 below the decimal point as illustrated in FIG. 9. This pattern is defined as $C_x$.

$$C_x = (0.1b)^x \times 1011000101110b$$

The reason that the same numerical sequence is repeated is as follows.

$$1 + C_x - 1 = (1 + C_x)^2 = 1 + 2C_x + C_x^2$$

Here, $C_x^2$ is a part exceeding required precision and is rounded down.

Using this rule, calculation of multiplying two values selected from the aforementioned values can be simplified. The multiplication result can be obtained through addition of the respective values.

$$(1+a) \cdot (1+b) = 1 + a + b + a \cdot b$$

Here, a·b is a part exceeding required precision and is truncated.

Therefore, the multiplication of each lower bit may be replaced with the following one multiplication operation.

$$y = 1 + (\frac{1}{2}^{24}) \cdot (\text{index}[-12:-23]) \times 1011000101110b$$

Concerning the above equation, the following numerical value will be described as an example.

$$2^{0.000000000001100000000001}$$

First, the lower 12 digits of the exponential part are defined as follows.

$$\text{index}[-12:-23] = 110000000001b$$

The numerical value may be expressed as follows using a fraction.

$$2^{0.00000000000110000000001} = 2^{\left(\frac{1}{2^{12}}+\frac{1}{2^{13}}+\frac{1}{2^{23}}\right)} \quad (12)$$

$$= 2^{\left(\frac{1}{2^{12}}\right)} \cdot 2^{\left(\frac{1}{2^{13}}\right)} \cdot 2^{\left(\frac{1}{2^{23}}\right)}$$

Here, since $C_x$ is defined as follows, $C_x=(0.1b)^x \times 1011000101110b=(\frac{1}{2}^x)\times1011000101110b$, and the following relationship is established.

$$2^{\left(\frac{1}{2^{12}}\right)} = 1 + C_{13} \quad (13)$$

Therefore, the numerical value may be expressed as follows.

$$2^{\left(\frac{1}{2^{12}}\right)} \cdot 2^{\left(\frac{1}{2^{13}}\right)} \cdot 2^{\left(\frac{1}{2^{23}}\right)} = \quad (14)$$

$$(1+C_{13})\cdot(1+C_{14})\cdot(1+C_{24}) = 1 + C_{13} + C_{14} +$$

$$C_{24} + C_{13}\cdot C_{14} + C_{14}\cdot C_{24} + C_{24}\cdot C_{13} + C_{13}\cdot C_{14}\cdot C_{24}$$

The multiplication part $(C_{13}\cdot C_{14}+C_{14}\cdot C_{24}+C_{24}\cdot C_{13}+C_{13}\cdot C_{14}\cdot C_{24})$ in Equation (14) above is a part exceeding required precision and is truncated, and the following simple equation is obtained.

$$1 + C_{13} + C_{14} + C_{24} = 1 + \left(\frac{1}{2^{13}} \times 1011000101110\ b\right) + \quad (15)$$

$$\left(\frac{1}{2^{14}} \times 1011000101110\ b\right) +$$

$$= 1 + \left(\frac{1}{2^{13}} + \frac{1}{2^{14}} + \frac{1}{2^{14}}\right) \times$$

$$1011000101110\ b$$

$$= 1 + \frac{1}{2^{24}} \cdot (2^{11} + 2^{10} + 2^0) \times$$

$$1011000101110\ b$$

$$= 1 + \frac{1}{2^{24}} \cdot (110000000001\ b) \times$$

$$1011000101110\ b$$

Here, the following equation defined above is applied.

Index[−12:−23]=1100000000001b

In this manner, it is possible to derive the following equation y.

$y=1+(\frac{1}{2}^{24})\cdot(\text{index}[-12:-23])\times1011000101110b$

This indicates that it is possible to provide the aforementioned equation y in the fifth embodiment through one addition operation, one multiplication operation, and one shift arithmetic operation, while it is necessary to obtain the value through multiplication and the root square extraction arithmetic operation for the value to be multiplied corresponding to the number of 1 in the respective digits of the exponential part according to the equation before the transformation.

5.1 Configuration of Arithmetic Operation Circuit

Figure 10:
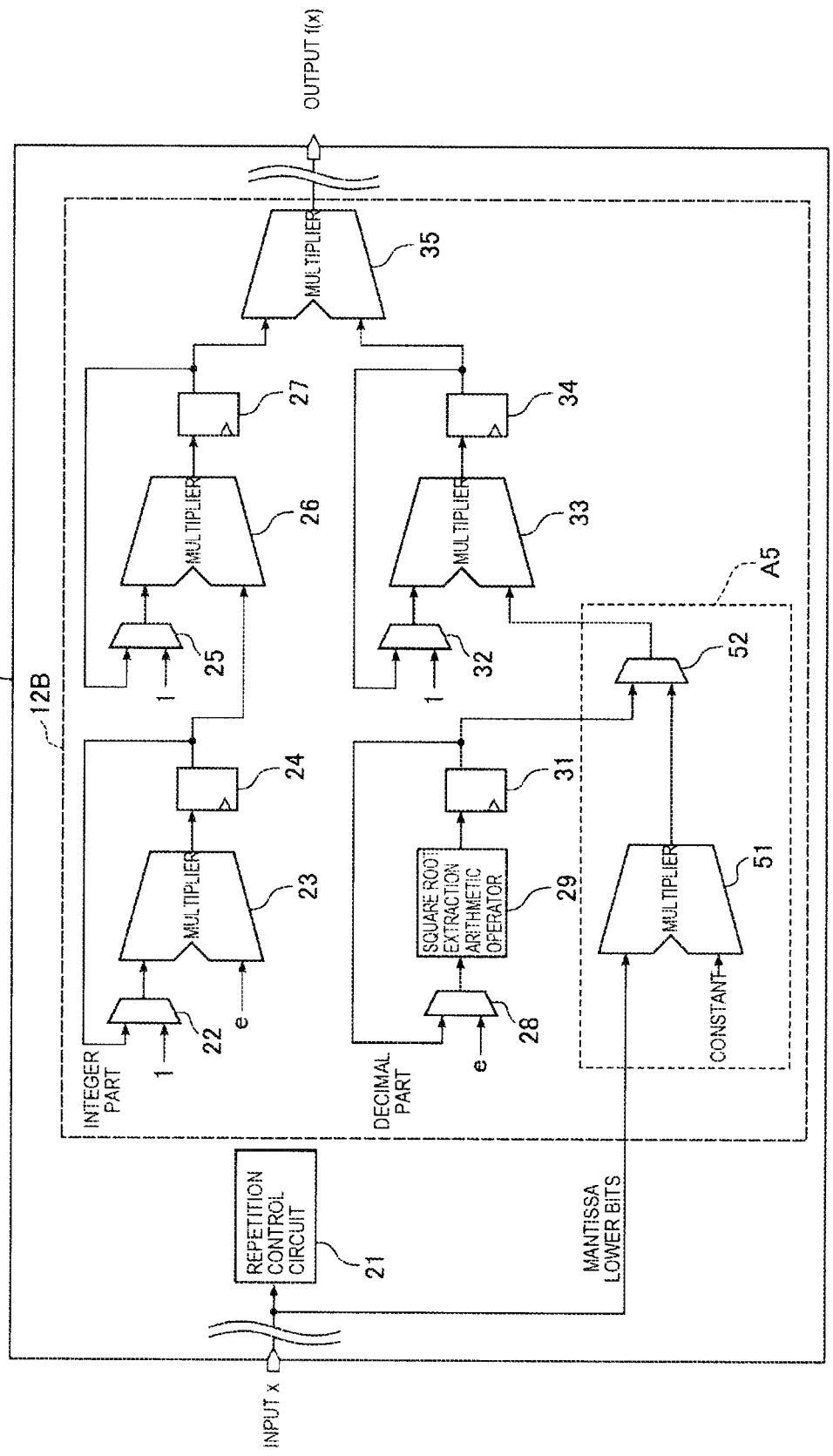
FIG. 10 is a block diagram illustrating a configuration of an arithmetic operation circuit including a power and square root extraction arithmetic operator according to a fifth embodiment.

Referring to FIG. 10, a configuration of an arithmetic operation circuit according to a fifth embodiment will be described. FIG. 10 is a block diagram illustrating a configuration of an arithmetic operation circuit 50 including a power and square root extraction arithmetic operator 12B according to the fifth embodiment. The circuit illustrated in FIG. 10 is obtained by adding a circuit A5 to the arithmetic operation circuit 200 illustrated in FIG. 5.

The arithmetic operation circuit 50 includes a repetition control circuit 21 and the power and square root extraction arithmetic operator 12B. The power and square root extraction arithmetic operator 12B includes multipliers 23, 26, 33, 35, and 51, multiplexers 22, 25, 28, 32, and 52, a square root extraction arithmetic operator 29, and latch circuits 24, 27, 31, and 34. Each of the multipliers 23, 26, 33, 35, and 51 has a first input terminal, a second input terminal, and an output terminal. Each of the square root extraction arithmetic operator 29 and the latch circuits 24, 27, 31, and 34 has an input terminal and an output terminal. Each of the multiplexers 22, 25, 28, 32, and 52 has a first input terminal, a second input terminal, a control terminal, and an output terminal.

5.2 Operations of Arithmetic Operation Circuit

Hereinafter, operations of the arithmetic operation circuit 50 according to the fifth embodiment will be described with reference to FIG. 10.

In the circuit that processes an integer part of the power and square root extraction arithmetic operator 12B in the arithmetic operation circuit 50, 1 is input to the first input terminal of the multiplexer 22, and an output signal from the output terminal of the multiplexer 22 is input to the first input terminal of the multiplier 23. An output signal from the output terminal of the multiplier 23 is input to the input terminal of the latch circuit 24, and a base e is input of the second input terminal of the multiplier 23.

An output signal from the output terminal of the latch circuit 24 is input to the second input terminal of the multiplexer 22 and the first input terminal of the multiplier 26, that is, the output signal from the output terminal of the latch circuit 24 is fed back to the second input terminal of the multiplexer 22 and is also input to the first input terminal of the multiplier 26.

One (1) is input to the first input terminal of the multiplexer 25, and an output signal from the output terminal of the multiplexer 25 is input to the second input terminal of the multiplier 26. An output signal from the output terminal of the multiplier 26 is input to the input terminal of the latch circuit 27, and an output signal from the output terminal of the latch circuit 27 is input to the second input terminal of the multiplexer 25 and the first input terminal of the multiplier 35, that is, the output signal from the output terminal of the latch circuit 27 is fed back to the second input terminal of the multiplexer 25 and is also input to the first input terminal of the multiplier 35.

An input signal x is input to the repetition control circuit 21. In the circuit that processes the decimal part of the power and square root extraction arithmetic operator 12B, a lower bit of a mantissa of the input signal x is input to the first input terminal of the multiplier 51. A constant is input to the second input terminal of the multiplier 51. An output signal from the output terminal of the multiplier 51 is input to the first input terminal of the multiplexer 52.

The base e is input to the first input terminal of the multiplexer 28, and an output signal from the output terminal of the multiplexer 28 is input to the input terminal of the square root extraction arithmetic operator 29. An output signal from the output terminal of the square root extraction arithmetic operator 29 is input of the input terminal of the latch circuit 31. An output signal from the output terminal of the latch circuit 31 is input to the second input terminal of the multiplexer 28 and the second input terminal of the multiplexer 52, that is, the output signal from the output terminal of the latch circuit 31 is fed back to the second input terminal of the multiplexer 28 and is also input to the second input terminal of the multiplexer 52.

An output signal from the output terminal of the multiplexer 52 is input to the first input terminal of the multiplier 33. 1 is input to the first input terminal of the multiplexer 32, and an output signal from the output terminal of the multiplexer 32 is input to the second input terminal of the multiplier 33. An output signal from the output terminal of the multiplier 33 is input to the input terminal of the latch circuit 34, and an output signal from the output terminal of the latch circuit 34 is input to the second input terminal of the multiplexer 32 and the second input terminal of the multiplier 35, that is, the output signal from the output terminal of the multiplier 35 is fed back to the second input terminal of the multiplexer 32 and is also input to the second input terminal of the multiplier 35. Using the arithmetic operation circuit 50 including such a power and square root extraction arithmetic operator 12B, simplified multiplication in the aforementioned power-of-2 calculation is performed, and the arithmetic operation of the sigmoid function f(x) is thus performed.

5.3 Advantages of Fifth Embodiment

According to the fifth embodiment, it is possible to achieve a reduced arithmetic operation time in the arithmetic operation circuit for performing an arithmetic operation of a sigmoid function and with low power consumption. In this manner, it is possible to easily implement the sigmoid function in hardware.

According to the fifth embodiment it is possible to reduce an arithmetic operation time in the arithmetic operation circuit and reduce power consumption by simplifying multiplication operation of lower 12 bits below a decimal point of an exponent in power-of-2 calculation of a sigmoid function. In this manner, it becomes easy to implement the sigmoid function in hardware.

The embodiment may be implemented in hardware using various arithmetic operators (or an arithmetic operation circuit) as described above or may be implemented in software using a processor such as a CPU or a DSP.

6. Sixth Embodiment

Next, an arithmetic operation circuit according to a sixth embodiment will be described. In the sixth embodiment, a method for simplifying multiplication calculation of upper 11 bits below a decimal point of an exponent in power-of-2 calculation of a sigmoid function.

Since there are no rules in a square root value of $x=2^1$ to $2^{11}$ in the power-of-2 calculation of a sigmoid function f(x), it is necessary to have fixed values of square roots in a table, include the aforementioned multiplication results of $2^{12}$ to $2^{23}$, and simply perform multiplication of each value (maximum of eleven times) as illustrated in B2 in FIG. 11.

However, when the number of times each bit is multiplied (the number of 1 in each bit) is equal to or greater than a half (six times), it is possible to reduce the number of times the multiplication is performed to ½ by converting the equation as represented by Equation (16) shown in FIG. 15. In this case, a fixed value table for reciprocals of the respective power roots may be prepared.

6.1 Configuration of Arithmetic Operation Circuit

Figure 12:
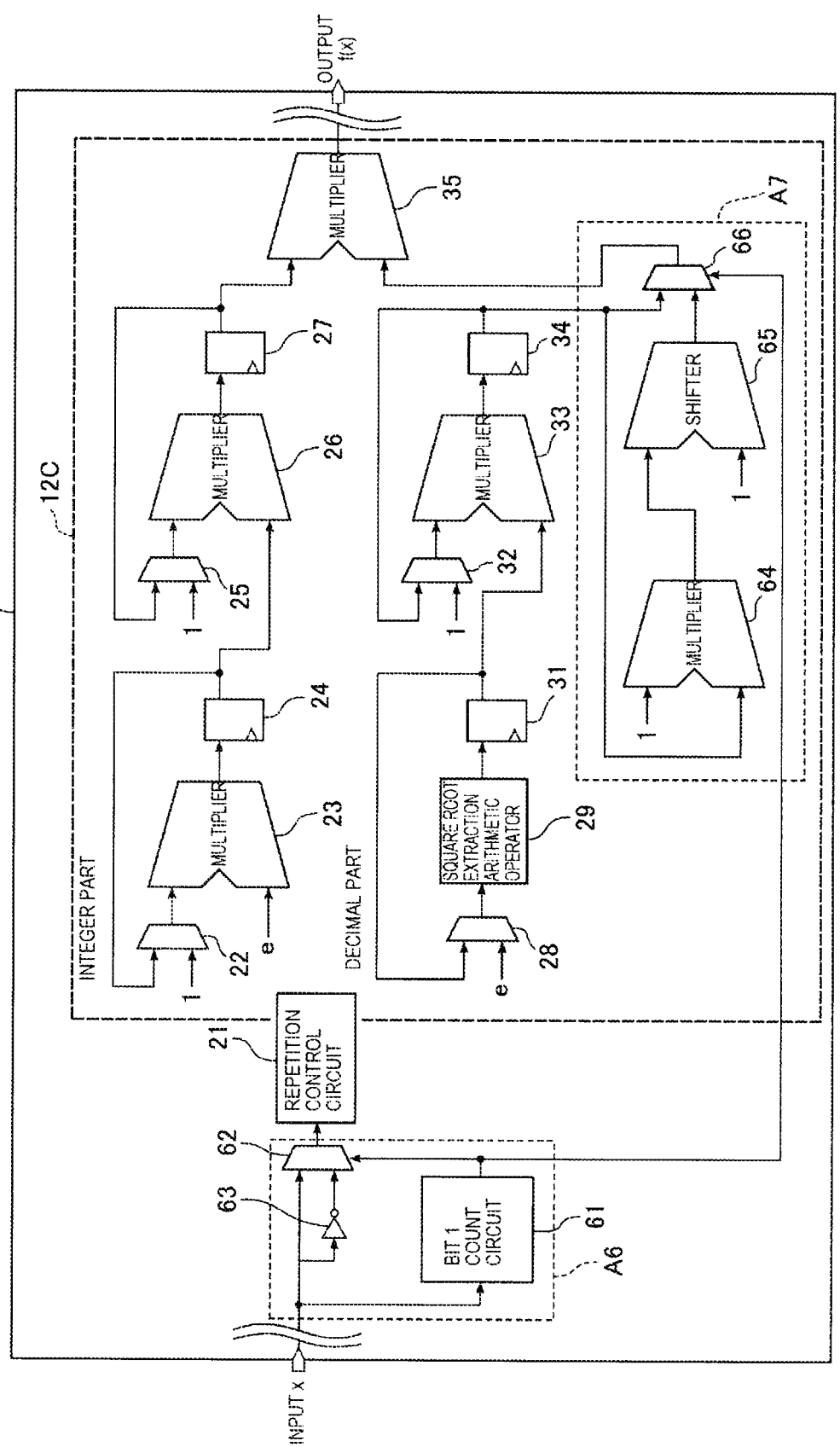
FIG. 12 is a block diagram illustrating a configuration of an arithmetic operation circuit according to a sixth embodiment.

Referring to FIG. 12, a configuration of an arithmetic operation circuit according to a sixth embodiment will be described. FIG. 12 is a block diagram illustrating a configuration of an arithmetic operation circuit 60 including a power and square root extraction arithmetic operator 12C according to the sixth embodiment. The circuit illustrated in FIG. 12 is obtained by adding circuits A6 and A7 to the arithmetic operation circuit 200 illustrated in FIG. 5.

The arithmetic operation circuit 60 includes a repetition control circuit 21, a power and square root extraction arithmetic operator 12C, a bit 1 count circuit 61, a multiplexer 62, and an inverter 63. The power and square root extraction arithmetic operator 12C includes multipliers 23, 26, 33, 35, and 64, multiplexers 22, 25, 28, 32, and 66, square root extraction arithmetic operator 29, latch circuits 24, 27, 31, and 34, and a shifter 65. Each of the multipliers 23, 26, 33, 35, and 64 and the shifter 65 has a first input terminal, a second input terminal, and an output terminal. Each of the square root extraction arithmetic operator 29 and the latch circuits 24, 27, 31, and 34 has an input terminal and an output terminal. Each of the multiplexers 22, 25, 28, 32, and 66 has a first input terminal, a second input terminal, a control terminal, and an output terminal.

6.2 Operations of Arithmetic Operation Circuit

Hereinafter, operations of the arithmetic operation circuit 60 according to the sixth embodiment will be described with reference to FIG. 12.

In a circuit that processes an integer part of the power and square root extraction arithmetic operator 12C of the arithmetic operation circuit 60, 1 is input to the first input terminal of the multiplexer 22, and an output signal from the output terminal of the multiplexer 22 is input to the first input terminal of the multiplier 23. An output signal from the output terminal of the multiplier 23 is input to the input terminal of the latch circuit 24, and a base e is input of the second input terminal of the multiplier 23.

An output signal from the output terminal of the latch circuit 24 is input to the second input terminal of the multiplexer 22 and the first input terminal of the multiplier 26, that is, the output signal from the output terminal of the latch circuit 24 is fed back to the second input terminal of the multiplexer 22 and is also input to the first input terminal of the multiplier 26.

One (1) is input to the first input terminal of the multiplexer 25, and an output signal from the output terminal of the multiplexer 25 is input to the second input terminal of the multiplier 26. An output signal from the output terminal of the multiplier 26 is input to the input terminal of the latch circuit 27, and an output signal from the output terminal of the latch circuit 27 is input to the second input terminal of the multiplexer 25 and the first input terminal of the multiplier 35, that is, the output signal from the output terminal of the latch circuit 27 is fed back to the second input terminal of the multiplexer 25 and is also input to the first input terminal of the multiplier 35.

An input signal x is input to the first input terminal of the multiplexer 62, and the input signal x is input to the second input terminal of the multiplexer 62 via the inverter. An output signal from the output terminal of the multiplexer 62 is input to the repetition control circuit 21. The input signal x is input to the input terminal of the bit 1 count circuit 61, and an output signal from the output terminal of the bit 1 count circuit 61 is input to the control terminals of the multiplexers 62 and 66.

In the circuit that processes a decimal part of the power and square root extraction arithmetic operator 12C, the base e is input to the first input terminal of the multiplexer 28, and the output signal from the output terminal of the multiplexer 28 is input to the input terminal of the square root extraction arithmetic operator 29. An output signal from the output terminal of the square root extraction arithmetic operator 29 is input of the input terminal of the latch circuit 31. An output signal from the output terminal of the latch circuit 31 is input to the second input terminal of the multiplexer 28 and to the first input terminal of the multiplier 33, that is, the output signal from the output terminal of the latch circuit 31 is fed back to the second input terminal of the multiplexer 28 and is also input to the first input terminal of the multiplier 33.

One (1) is input to the first input terminal of the multiplexer 32, and an output signal from the output terminal of the multiplexer 32 is input to the second input terminal of the multiplier 33. An output signal from the output terminal of the multiplier 33 is input to the input terminal of the latch circuit 34, and an output signal from the output terminal of the latch circuit 34 is input to the second input terminal of the multiplexer 32, the first input terminal of the multiplexer 66, and the first input terminal of the multiplier 64, that is, the output signal from the output terminal of the latch circuit 34 is fed back to the second input terminal of the multiplexer 32, is also input to the first input terminal of the multiplexer 66, and is further input to the first input terminal of the multiplier 64.

One (1) is input to the second input terminal of the multiplier 64, and an output signal from the output terminal of the multiplier 64 is input to the first input terminal of the shifter 65. 1 is input to the second input terminal of the shifter 65, and an output signal from the output terminal of the shifter 65 is input to the second input terminal of the multiplexer 66. Further, an output signal from the output terminal of the multiplexer 66 is input to the second input terminal of the multiplier 35. Using the arithmetic operation circuit 60 including such a power and square root extraction arithmetic operator 12C, simplified multiplication in the aforementioned power-of-2 calculation is performed, and the arithmetic operation of the sigmoid function f(x) is thus performed.

6.3 Advantages of Sixth Embodiment

According to the sixth embodiment, it is possible to achieve a reduced arithmetic operation time in the arithmetic operation circuit for performing an arithmetic operation of a sigmoid function and with low power consumption. In this manner, it is possible to easily implement the sigmoid function in hardware.

According to the sixth embodiment, it is possible to reduce an arithmetic operation time of the arithmetic operation circuit and to reduce power consumption by simplifying multiplication calculation of upper 11 bits below a decimal point of an exponent in power-of-2 calculation of a sigmoid function. In this manner, it becomes easy to implement the sigmoid function in hardware. Also, it is possible to reduce the circuit scale in the embodiment than when all combinations are implemented in a lookup table.

The embodiment may be implemented in hardware using various arithmetic operators (or an arithmetic operation circuit) as described above or may be implemented in software using a processor such as a CPU or a DSP.

7. Other Modification Examples and the Like

The aforementioned first to sixth embodiments can employ the following aspects.

(1) According to a first embodiment, there is provided an arithmetic operation circuit that performs an arithmetic operation of a sigmoid function, the arithmetic operation circuit including: a first multiplier that has a first input terminal to which an input signal is input and a second input terminal to which a first signal (−a signal) is input; a power and square root extraction arithmetic operator that has a first input terminal to which an output of the first multiplier is input and a second input terminal to which a base e of a natural logarithm is input; an adder that has a first input terminal to which an output of the power and square root extraction arithmetic operator are input and a second input terminal to which 1 is input; a divider that has a first input terminal to which an output of the adder is input and a second input terminal to which 1 is input; a subtractor that has a first input terminal to which an output of the divider is input and a second input terminal to which 1 is input; and a first multiplexer that has a first input terminal to which an output of the divider is input and a second input terminal to which an output of the subtractor is input.

(2) According to a second embodiment, the power and square root extraction arithmetic operator includes: a barrel shifter that has a first input terminal to which an input signal is input and a second input terminal to which is input; a second multiplexer that has a first input terminal to which 2 is input and a second input terminal; a square root extraction arithmetic operator to which an output from the second multiplexer is input; a third multiplexer that has a first input terminal to which 1 is input and a second input terminal; a second multiplier that has a first input terminal to which an output from the square root extraction arithmetic operator is input and a second input terminal to which an output from the third multiplexer is input; and a third multiplier that has a first input terminal to which an output from the barrel shifter is input and a second input terminal to which an output from the second multiplier is input, an output from the square root extraction arithmetic operator is input to the second input terminal of the second multiplexer, and an output from the second multiplier is input to the second input terminal of the third multiplexer, in the arithmetic operation circuit described in (1) described above.

(3) According to third and fourth embodiments, there is provided an arithmetic operation circuit that performs an arithmetic operation of a sigmoid function, the arithmetic operation circuit including: a first multiplier that has a first input terminal to which an input signal is input and a second input terminal to which a first signal (−a signal) is input; a power and square root extraction arithmetic operator that has a first input terminal to which an output from the first multiplier is input and a second input terminal to which a base e of a natural logarithm is input; a first divider that has a first input terminal to which an output from the power and square root extraction arithmetic operator is input and a second input terminal to which 1 is input; a first multiplexer that has a first input terminal to which an output from the power and square root extraction arithmetic operator is input and a second input terminal to which an output of the first divider is input; an adder that has a first input terminal to which an output from the first multiplexer is input and a second input terminal to which 1 is input; a second divider that has a first input terminal to which an output from the adder is input and a second input terminal to which 1 is input; a first comparator that has a first input terminal to which the input signal is input and a second input terminal to which 26 is input; a second comparator that has a first input terminal to which the input signal is input and a second input terminal to which −26 is input; a second multiplexer that has a first input terminal to which an output from the second divider is input, a second input terminal to which 1 is input, and a control terminal to which an output from the first comparator is input; and a third multiplexer that has a first input terminal to which an output from the second multiplexer is input, a second input terminal to which 0 is input, and a control terminal to which an output from the second comparator is input.

(4) According to a fifth embodiment, the power and square root extraction arithmetic operator includes: a second multiplier that has a first input terminal to which a lower bit of a mantissa of an input signal is input and a second input terminal to which a second signal (constant) is input, a second multiplexer that has a first input terminal to which 1 is input and a second input terminal; a third multiplier that has a first input terminal to which an output from the second multiplexer is input and a second input terminal to which the base e of the natural logarithm is input; a third multiplexer that has a first input terminal to which 1 is input and a second input terminal; a fourth multiplier that has a first input terminal to which an output from the third multiplexer is input and a second input terminal to which an output from the third multiplier is input; a fourth multiplexer that has a first input terminal to which the base e of the natural logarithm is input and a second input terminal; a square root extraction arithmetic operator to which an output from the fourth multiplexer is input; a fifth multiplexer that has a first input terminal to which an output from the first multiplier is input and a second input terminal to which an output from the square root extraction arithmetic operator is input; a sixth multiplexer that has a first input terminal to which 1 is input and a second input terminal; a fifth multiplier that has a first input terminal to which an output from the fifth multiplexer is input and a second input terminal to which an output from the sixth multiplexer is input; and a sixth multiplier that has a first input terminal to which an output from the fourth multiplier is input and a second input terminal to which an output from the fifth multiplier is input, an output from the third multiplier is input to the second input terminal of the second multiplexer, an output from the fourth multiplier is input to the second input terminal of the third multiplexer, an output from the root square arithmetic operator is input to the second input terminal of the fourth multiplexer, and an output from the fifth multiplexer is input to the second input terminal of the sixth multiplexer, in the arithmetic operation circuit described in (1) above.

(5) According to a sixth embodiment, the power and square root extraction arithmetic operator includes: a bit 1 count circuit to which the input signal is input; a second multiplexer that has a first input terminal to which 1 is input and a second input terminal; a second multiplier that has a first input terminal to which an output from the second multiplexer is input and a second input terminal to which the base e of the natural logarithm is input; a third multiplexer that has a first input terminal to which 1 is input and a second input terminal; a third multiplier that has a first input terminal to which an output from the second multiplier is input and a second input terminal to which an output from the third multiplexer is input; a fourth multiplexer that has a first input terminal to which the base e of the natural logarithm is input and a second input terminal; a square root extraction arithmetic operator to which an output from the fourth multiplexer is input; a fifth multiplexer that has a first input terminal to which 1 is input and a second input terminal; a fourth multiplier that has a first input terminal to which an output from the square root extraction arithmetic operator is input and a second input terminal to which an output from the fifth multiplexer is input; a fifth multiplier that has a first input terminal to which an output from the fourth multiplier is input and a second input terminal to which 1 is input; a shifter that has a first input terminal to which an output from the fifth multiplier is input and a second input terminal to which 1 is input; a sixth multiplexer that has a first input terminal to which an output from the fourth multiplier is input and a second input terminal to which an output from the shifter is input; and a sixth multiplier that has a first input terminal to which an output from the third multiplier is input and a second input terminal to which an output from the sixth multiplexer is input, an output from the second multiplier is input to the second input terminal of the second multiplexer, an output from the third multiplier is input to the second input terminal of the third multiplexer, an output from the square root extraction arithmetic operator is input to the second input terminal of the fourth multiplexer, an output from the fourth multiplier is input to the second input terminal of the fifth multiplexer, and an output from the bit 1 count circuit is input to the control terminal of the sixth multiplexer, in the arithmetic operation circuit described in (1) above.

Although the description that the arithmetic operation circuit according to the embodiments is used in a neural network has been provided in this specification, the arithmetic operation circuit according to the embodiments is not limited to the neural network and may be used for various circuits, devices, applications, and the like using a sigmoid function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic operation system comprising: a neural network layer including an arithmetic operation circuit that performs an arithmetic operation of a sigmoid function, the arithmetic operation circuit comprising:

a multiplier circuit configured to perform multiplication of an input value that is input to the arithmetic operation circuit with a constant, and output a first calculation result of the multiplication;

a power and square root extraction arithmetic operator circuit configured to perform an exponent arithmetic operation using a Napier's constant e as a base and using the first calculation result as an exponent in the exponent arithmetic operation, and output a second calculation result of the exponent arithmetic operation;

an adder and divider circuit configured to perform addition of the second calculation result with 1 to output an added value and division of 1 by the added value to output a third calculation result of the addition and division;

a subtractor circuit configured to subtract the third calculation result from 1 and output a subtracted value as a fourth calculation result;

and a multiplexer configured to output the third calculation result as an output result of the sigmoid function when the input value is a negative number and output the fourth calculation result as the output result of the sigmoid function when the input value is a positive number.

2. The arithmetic operation system according to claim 1, wherein the multiplexer is configured to receive the third calculation result at a first input terminal, the fourth calculation result at a second input terminal, and output one of the received third calculation result and the received fourth calculation result based on a selection signal received at a third input terminal.

3. The arithmetic operation system according to claim 2, wherein the multiplexer outputs the received third calculation result as the output result of the sigmoid function when the selection signal indicates that the input value is a negative number, and outputs the fourth calculation result as the output result of the sigmoid function when the selection signal indicates that the input value is a positive number.

4. The arithmetic operation system according to claim 3, further comprising:

a second multiplexer configured to output 1 as the output result of the sigmoid function when the input value is equal to or greater than a first value.

5. The arithmetic operation system according to claim 4, further comprising:

a third multiplexer configured to output 0 as the output result of the sigmoid function when the input value is equal to or less than a second value.

6. An arithmetic operation system comprising: a neural network layer including an arithmetic operation circuit that performs an arithmetic operation of a sigmoid function, the arithmetic operation circuit comprising: a multiplier circuit configured to perform multiplication of an input value that is input to the arithmetic operation circuit with a constant, and output a first calculation result of the multiplication;

a power and square root extraction arithmetic operator circuit configured to perform an exponent arithmetic operation using 2 as a base and using the first calculation result a as an exponent in the exponent arithmetic operation, and output a second calculation result of the exponent arithmetic operation;

an adder and divider circuit configured to perform addition of the second calculation result with 1 to output an added value and division of 1 by the added value to output a third calculation result of the addition and division;

a subtractor circuit configured to subtract the third calculation result from 1 and output a subtracted value as a fourth calculation result;

and a multiplexer configured to output the third calculation result as an output result of the sigmoid function when the input value is a negative number and output the fourth calculation result as the output result of the sigmoid function when the input value is a positive number.

7. The arithmetic operation system according to claim 6, wherein the multiplexer is configured to receive the third calculation result at a first input terminal, the fourth calculation result at a second input terminal, and output one of the received third calculation result and the received fourth calculation result based on a selection signal received at a third input terminal.

8. The arithmetic operation system according to claim 7, wherein the multiplexer outputs the received third calculation result as the output result of the sigmoid function when the selection signal indicates that the input value is a negative number, and outputs the fourth calculation result as the output result of the sigmoid function when the selection signal indicates that the input value is a positive number.

9. The arithmetic operation system according to claim 8, further comprising:

a second multiplexer configured to output 1 as the output result of the sigmoid function when the input value is equal to or greater than a first value.

10. The arithmetic operation system according to claim 9, further comprising:

a third multiplexer configured to output 0 as the output result of the sigmoid function when the input value is equal to or less than a second value.

* * * * *